(12) United States Patent
Sutton (10) Patent No.: US 8,719,150 B2
(45) Date of Patent: *May 6, 2014

(54) AUTOMATED TRADING SYSTEM AND METHODOLOGY FOR REALTIME IDENTIFICATION OF STATISTICAL ARBITRAGE MARKET OPPORTUNITIES

(71) Applicant: Remington John Sutton, Lubbock, TX (US)

(72) Inventor: Remington John Sutton, Lubbock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/020,986

(22) Filed: Sep. 9, 2013

(65) Prior Publication Data
US 2014/0012731 A1    Jan. 9, 2014

Related U.S. Application Data

(62) Division of application No. 12/266,295, filed on Nov. 6, 2008, now Pat. No. 8,533,098.

(60) Provisional application No. 60/985,690, filed on Nov. 6, 2007.

(51) Int. Cl.
*G06Q 40/00* (2012.01)
*G06Q 40/04* (2012.01)

(52) U.S. Cl.
CPC .................................. *G06Q 40/04* (2013.01)

USPC ................ 705/37; 705/42; 705/26.1; 705/35; 705/38; 705/39; 705/40; 705/26.8; 705/313; 705/36 R; 707/661; 713/176

(58) Field of Classification Search
USPC ......... 705/37, 35, 38, 39, 26.1, 40, 26.8, 313, 705/36 R; 707/661; 713/176
See application file for complete search history.

(56) References Cited

U.S. PATENT DOCUMENTS

| | | | |
|---|---|---|---|
| 7,542,940 B2 * | 6/2009 | Burns et al. ..................... 705/37 |
| 7,774,261 B1 * | 8/2010 | Mintz et al. ..................... 705/37 |
| 7,813,995 B2 * | 10/2010 | Burns et al. ..................... 705/37 |
| 7,921,050 B1 * | 4/2011 | Chadwick .................. 705/36 R |
| 8,180,692 B2 * | 5/2012 | Kemp et al. ..................... 705/35 |
| 8,249,976 B1 * | 8/2012 | Prybell et al. ................... 705/37 |
| 8,374,947 B2 * | 2/2013 | Farrell et al. .................... 705/37 |
| 2002/0059129 A1 * | 5/2002 | Kemp et al. ..................... 705/37 |
| 2003/0130929 A1 * | 7/2003 | Waddell .......................... 705/37 |
| 2003/0154152 A1 * | 8/2003 | Gilbert et al. ................... 705/37 |
| 2004/0267655 A1 * | 12/2004 | Davidowitz et al. ........... 705/37 |

* cited by examiner

*Primary Examiner* — Tien Nguyen
(74) *Attorney, Agent, or Firm* — Van Dyke Law; Raymond Van Dyke (57) ABSTRACT

A program for identifying and automatically acting on statistical arbitrage opportunities between related equities and contracts. The present invention describes an improved technique to perform statistical-pairs arbitraging in a dynamic marketplace with less risk than prior art approaches. The present invention employs an array of recent data and performance ratios involving bid and ask prices for correlated items, such as stocks.

20 Claims, 8 Drawing Sheets

Figure 8

AUTOMATED TRADING SYSTEM AND METHODOLOGY FOR REALTIME IDENTIFICATION OF STATISTICAL ARBITRAGE MARKET OPPORTUNITIES

CROSS REFERENCE TO RELATED APPLICATIONS

The present invention is a divisional of and claims priority from pending U.S. patent application Ser. No. 12/266,295, filed Nov. 6, 2008, now U.S. Pat. No. 8,533,098, entitled "System and Method for an Automated Sales System With Remote Negotiation and Post-Sale Verification," which relies upon U.S. Patent Provisional Application Ser. No. 60/985,690, filed Nov. 6, 2007, also entitled "System and Method for an Automated Sales System With Remote Negotiation and Post-Sale Verification," the subject matters of which are incorporated by reference herein.

FIELD OF THE INVENTION

The present invention relates to a statistical-pairs arbitrage technique, more specifically a data-driven system and algorithm that performs the task automatically.

BACKGROUND

In recent years, quantitative and statistical analysis of past market behavior has been used to predict future gains. This has been the goal of many chartists and analysts for years, but until recently, data of the quality, reliability, and time/volume detail has simply not been recorded due to lack of the great speed and size of storage systems and resources required to keep it up to date. This lack of technology, as applied to market recording, has recently been compensated for by second-party data vendors that make the detailed Best Bid-Offer (BBO) and Depth of Market (DOM) data available to programmers willing to pay a price.

The present invention takes advantage of the new technological advances over the more limited prior art techniques to solve increasingly difficult problems posed by hedge fund and other company and individual requests. The ready availability of the wealth and depth of market data, and the speed of access makes possible transactions in realtime that are more risk averse or even risk free, permitting arbitrage and other activities at volumes, scales and approaches radically difficult from those employed in the prior art.

SUMMARY OF THE INVENTION

The present invention describes an improved technique to perform statistical-pairs arbitraging in a dynamic marketplace with less risk than prior art approaches. The present invention employs an array of recent data and performance ratios involving bid and ask prices for correlated items, such as stocks, futures, equities, commodities and other instruments.

BRIEF DESCRIPTION OF THE DRAWINGS

While the specification concludes with claims particularly pointing out and distinctly claiming the subject matter that is regarded as forming the present invention, it is believed that the invention will be better understood from the following description taken in conjunction with the accompanying Drawings, in which:

DETAILED DESCRIPTION OF THE PRESENT INVENTION

The following detailed description is presented to enable any person skilled in the art to make and use the invention. For purposes of explanation, specific nomenclature is set forth to provide a thorough understanding of the present invention. However, it will be apparent to one skilled in the art that these specific details are not required to practice the invention. Descriptions of specific applications are provided only as representative examples. Various modifications to the preferred embodiments will be readily apparent to one skilled in the art, and the general principles defined herein may be applied to other embodiments and applications without departing from the spirit and scope of the invention. The present invention is not intended to be limited to the embodiments shown, but is to be accorded the widest possible scope consistent with the principles and features disclosed herein.

The prior art is replete with techniques that fall short of the advantages shown in the present invention. For example, attached is an exemplary arbitrage article entitled "Risk Arbitrage Opportunities in Petroleum Futures Spreads", incorporated herein by reference, which although describing a potential platform for using the principles of the present invention, is like all of the other prior art Applicant is aware, i.e., deficient. Nonetheless, this arbitrage article is exemplary of the prior art and will be referenced herein for background.

Proposed herein is a trading system and methodology that reacts to real-time market data and automatically executes trades starting from the basic correlated pairs-trading model described above. Where the model differs from the standard is in the exact method of determining the buy and sell signals. The signals for acquiring a position are determined by a unique method of measuring statistical deviation from a historical relationship during a traveling time span of BBO data to the current bid/offer price. It instantly determines if the spread of the pair is relatively over/undervalued in the most recent market conditions, taking the bid/ask transaction costs into account. A corresponding series of trade orders is then issued in a sequence which increases the total positions while maintaining an efficient hedge.

The sell signals are another area which deviates from the standard model. The standard format says that the positions should be exited when the pair reaches the mean relationship; calculating the mean from the dynamic data set. The algorithm of the present invention untraditionally determines the mean relationship and overcomes many of the hurdles of dynamic markets, increasing the percentage of profitable trades. The values for the buy/sell signals and other variables were initially selected by intuitive guesses and some occasional wild ones that turned out to be generally correct. Eventually these variables were optimized after thousands of incremental combinations of the fixed signals and variables. Their combined effectiveness was rated using their performance on a mock portfolio speeding through roughly 7 months of BBO historical data for the Gasoline and Crude contracts traded on NYMEX. Additionally, some of the most important variables are dynamically based on the market conditions. Applicant believes that there is much potential for increasing the efficiency and profitability of the algorithm.

The methodology for the strategy itself is rooted in the statistical analysis of dynamic data streaming in from the two correlated markets in continuous time. By the chaotic nature of market data, these traveling data sets present interesting and occasionally non-linear results as the variables are changed. Specifically, the shortening of the length of historical data stored in the data set can yield seemingly random results in back-tests.

The initial perception of randomness is misplaced and Applicant managed to find that this problem with the small data set was due to the quality of the samples being added at each interval of measurement. Applicant first attempted to quantify the bid-offer spread by using the average between the bid and offer in each contract as the basis for the comparison of the spread between the pairs. It became immediately apparent, however, that the moment the first mock trade was entered that the data set did not adequately describe the relationship in the spread at the small scale. The Z-score of comparing the position that resulted from the transaction costs reflected dozens of standard deviations from the mean, when the Z-score should have been very close to the entrance signal.

It is not only the effect of averaging in the contract's transaction spread that cripples the integrity of the data set, but also the underlying differences in the paired markets. For the contract pairs to work in a pairs strategy, they must have a high correlation coefficient. But this does not mean that they must trade with the same market liquidity or pricing structure in order to be successful. To refer back to the Gasoline/Crude example, it clearly illustrates both aspects of varying liquidity and differing trading units between the two contracts.

To overcome both of these issues, the data must be manipulated prior to admission into the data set. The manipulation devised herein was aimed at combining the two markets in a way in which the $0.01 ticks of crude would not overshadow the $0.0001 as an average or difference method would. Applicant considered that the ideal comparison would be to take the ratio of one to the other. However, the next problem one faces is how to take the bid of one contract and the offer of the other in a ratio and not have the data set biased towards that position. Applicant discovered that the answer is simply to add both the [bid of A/offer of B] and [ask of A/offer of B] simultaneously at every interval as if they were two separate observations.

This practice of using two observations which are selected to be as far apart as possible can be described as maintaining a larger variance in a data set during every observation. When the previously failed back-test attempt was made using this manipulated data set, the immediate value of the Z-score was barely affected, as one would initially hope. Not only does the instant technique provide the only effective method for using these limited sample sets, but it enables the strategy to accurately gauge its transaction cost as a component of the statistics.

The aforementioned arbitrage article does not approach these particularly difficult dilemmas faced above when using the smaller time scales, and simply does not have to address them under the paradigm presented.

Additional differences of the present invention from prior art approaches include the length of the historical ratio, the frequency of data added to the historical rate, and the particular usage of not one but two (or more) signals for entering multiple positions. The goal of entering into positions based on multiple signals is to be able to expose a smaller portion of the account to the minor daily fluctuations of the trading, while not crippling them when larger movements take place. These larger but less frequent movements would be capitalized on by the larger signals and the remaining funds in the account. This was an entertaining idea, until an evolutionary algorithm back-tested on the historical data showed that the optimal combination of the two signal variables was slightly less efficient than simply choosing one good signal variable in the middle. This capability is still featured in the code, however, limiting the second "wave" of purchases to 0 contracts.

Figure 1:
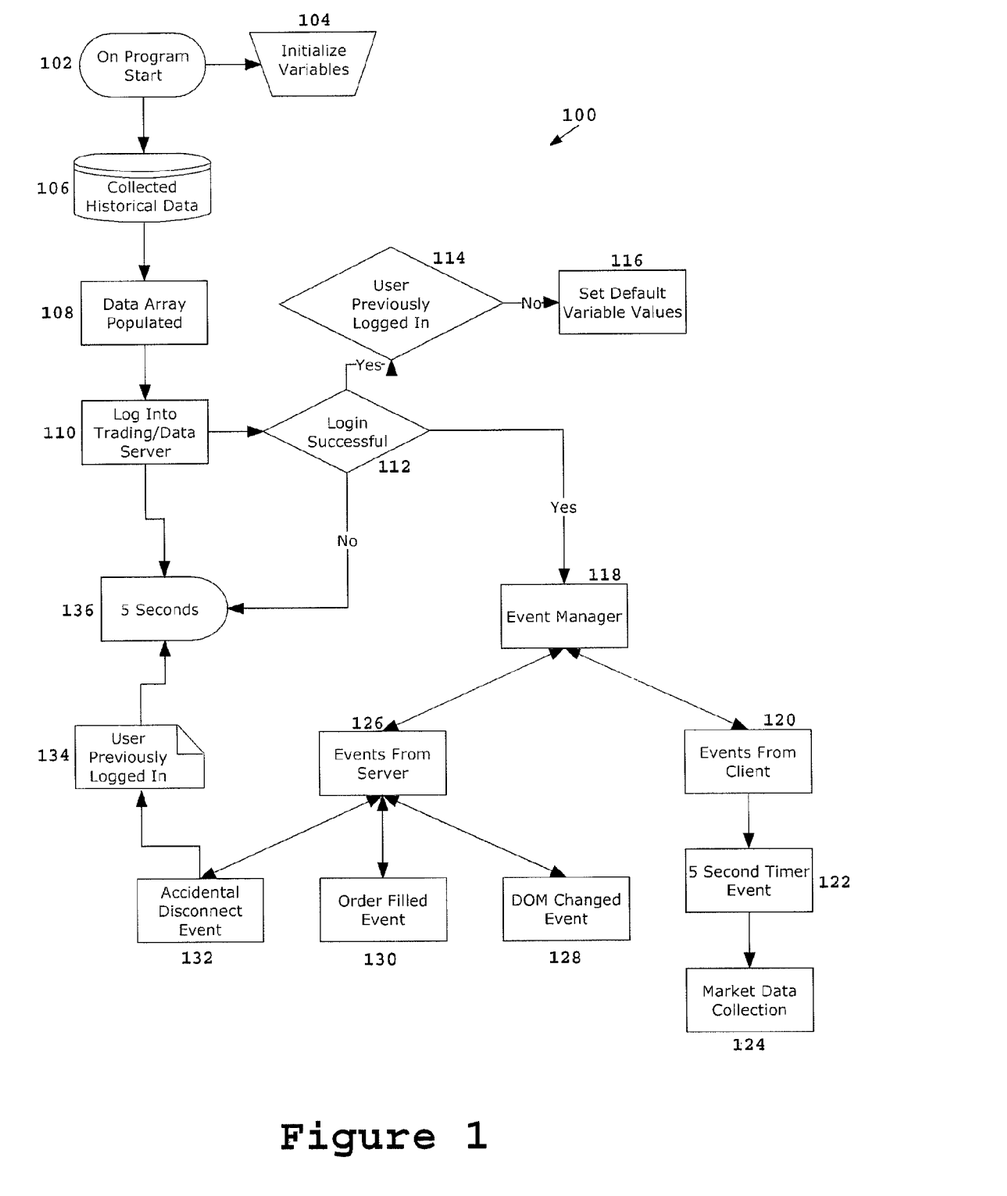
FIG. 1 is a flowchart illustrating various operational aspects in the present invention.

With reference now to FIG. 1 of the Drawings, there is illustrated therein an operational aspect of the instant methodology and system, generally designated by the reference numeral 100. On start of program, designated by reference numeral 102, various variables are initialized 104 and historical data collected 106. As the data accumulates, an array is populated 108. As illustrated, users must log into the trading or data server 110 and if successful 112, a determination is made whether the user has previously logged in 114. If not, then various default variables are set 116.

As shown in FIG. 1, if login is successful 112, control is passed to an event manager 118, which coordinates events from a client 120 and events from a server 126. If events from a client 120 are designated, then a five-second timer event 122 occurs and market data collection 124 is commenced. If events from a server 126 are designated, a variety of events are then coordinated, including a DOM changed event 128, an order-filled event 130 and an accidental disconnect event 132, as illustrated. At the accidental disconnect event 132, if a user has previously logged in 134, then a five-second rule 136 occurs, which also occurs after login 110.

In a further embodiment of the present invention, additional description of a system and methodology for trading correlated pairs of investment instruments with buy/sell triggers based on indicators is provided herein. More particularly, the indicators in this embodiment are updated in 5-second increments, as illustrated in FIG. 1 in reference identifiers 122 and 136. It should, of course, be understood that other increments may be employed. It should be understood to those of skill in the art that this initiates replenishment of the data in an array with more recent data and new ratio indicator computations, thereby overwriting or replacing the oldest corresponding data and ratios.

Figure 2:
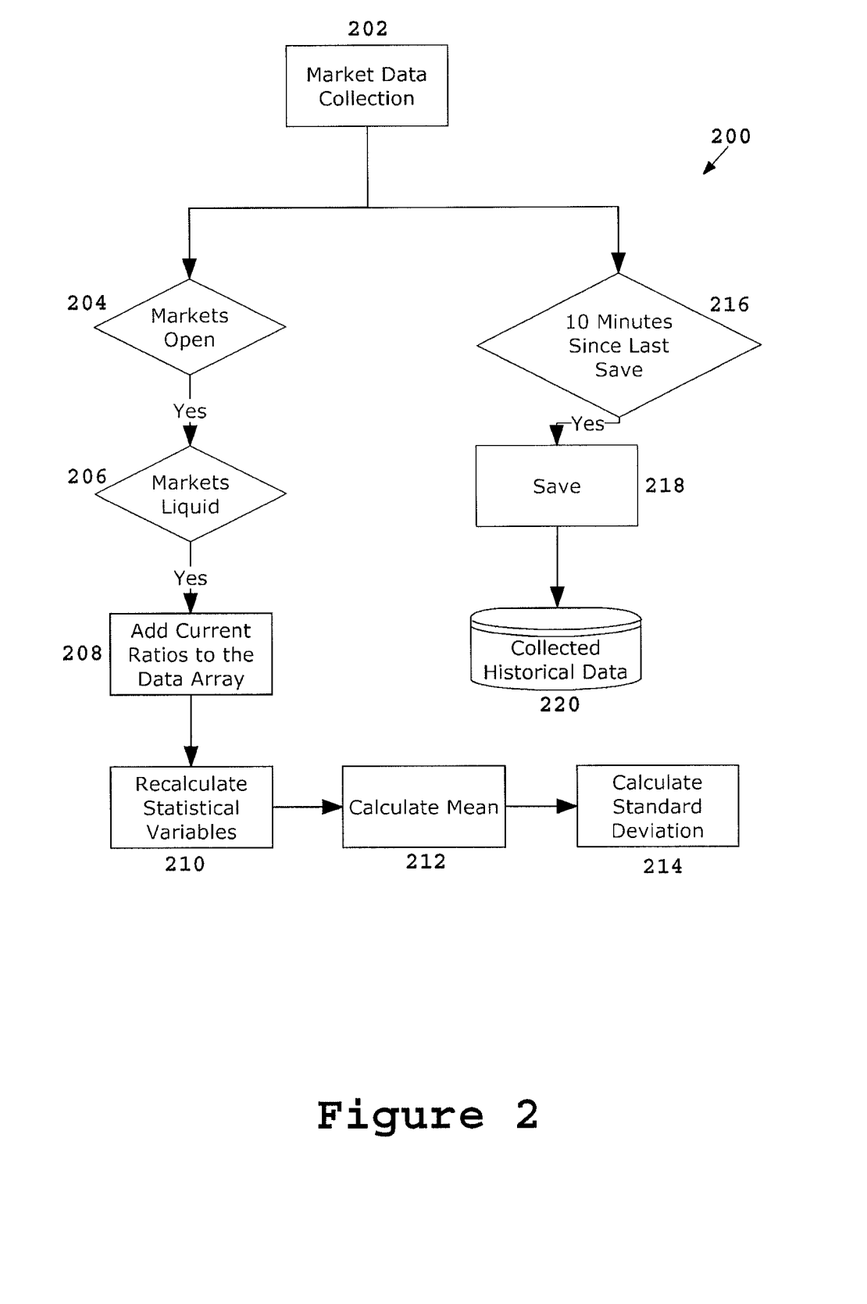
FIG. 2 is a flowchart illustrating various data storage and manipulation operations pursuant to the teachings of the present invention.

With reference now to FIG. 2 of the Drawings, there is illustrated therein various additional operational aspects of the present invention, generally designated by the reference numeral 200, particularly concerning market data collection 202. More particularly, when the markets open 204 and are liquid 206, the aforementioned bid and ask data, along with the ratios computed therefrom are added to the aforementioned data array 208, various statistical variables are recalculated 210, the mean is calculated 212 and the standard deviations calculated 214. As illustrated in FIG. 2, market data collection 202 also triggers a periodic, e.g., every ten minutes, capture of the data 216 and saving 218 into a backup 220, as also illustrated in FIG. 1.

The accumulated historical data 106 is backed up in a file 220 so that the program does not have to collect data for 2 days should its function be interrupted. This is automatically fed in from the last run of the program when it is started, i.e., reference identifiers 102 and 104.

In particular, the two correlated pairs of stocks/futures contracts or other investment instrument is used to collect the bid and ask data for each of them as it is generated until it accumulates in a two-day history. In the fashion described in the previous paragraphs, the bid of contract one is divided by the offer of contract two and that dividend is added to the array, plus the offer of contract one is divided by the bid of contract two is also immediately added. As discussed, data is preferably collected every five seconds (136) during the hours that NYMEX is traded on the floor from 10 am to 2:30 pm (204), until two days of data history have been collected. Although the manipulation of the data prior to its admission in the array boasts an ability to account for transaction costs and varying liquidities, the enormous spreads observed in after-hours trading make the data much less useful.

Secondly, this array comprises the two-day average and is the set from which the standard deviation is calculated (214). When more than two days of data are collected, then a replacement process begins by deleting the oldest data and replacing it with the newest data pursuant to known computer science database techniques, e.g., employing pointers into an array for overwriting the oldest content therein. The replacement preferably occurs every five seconds, seriatim, until the entire two days have been cycled through and replaced with new data, and then the process begins again. When more than two days of data has accumulated, the trading pursuant to the principles of the present invention is triggered. Each time the depth of market changes (128), which is the number of tiers between the bid and ask prices that change, on either of the two contracts, then the ratio of the two is analyzed by taking the Z-score of the ratio.

Figure 3:
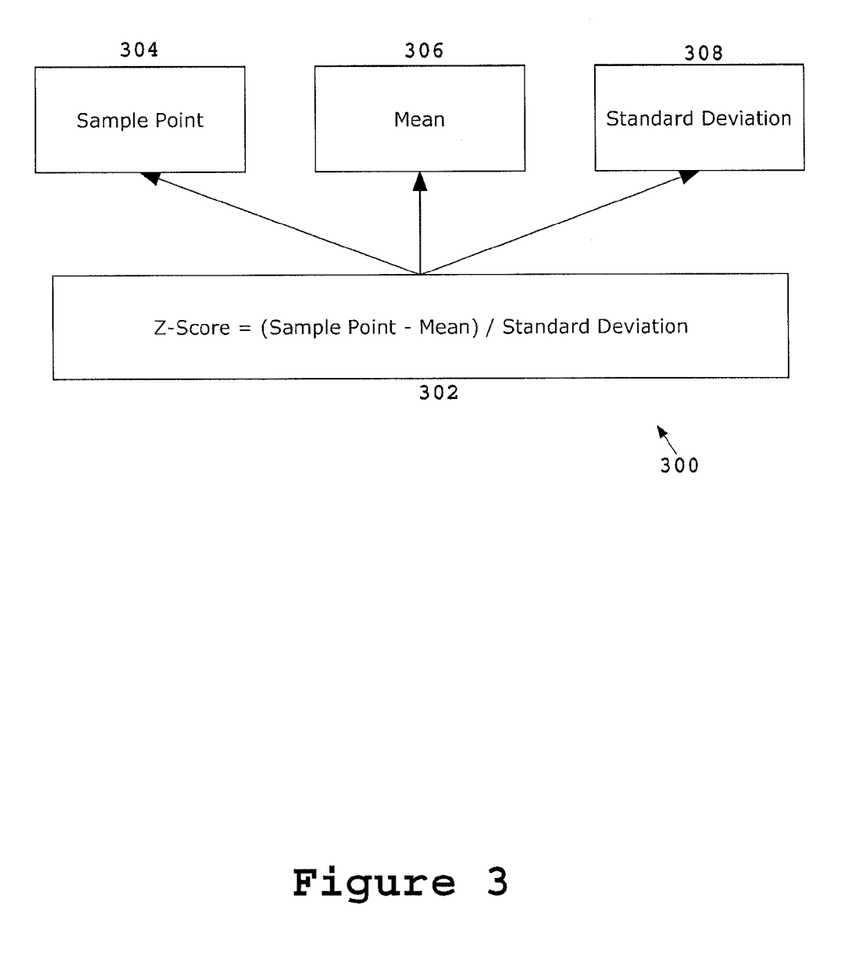
FIG. 3 is a box diagram illustrating various usages of a Z-score calculation in the present invention.

With reference now to FIG. 3, there is illustrated therein various usages of the aforementioned Z-score, generally designated by the reference numeral 300. As illustrated, the Z-score is calculated as the difference between a sample point and the mean, divided by the standard deviation, designated by reference identifier 302. This calculation is then employed in further relationships with a sample point 304, mean 306 and standard deviation 308, as illustrated.

Figure 4:
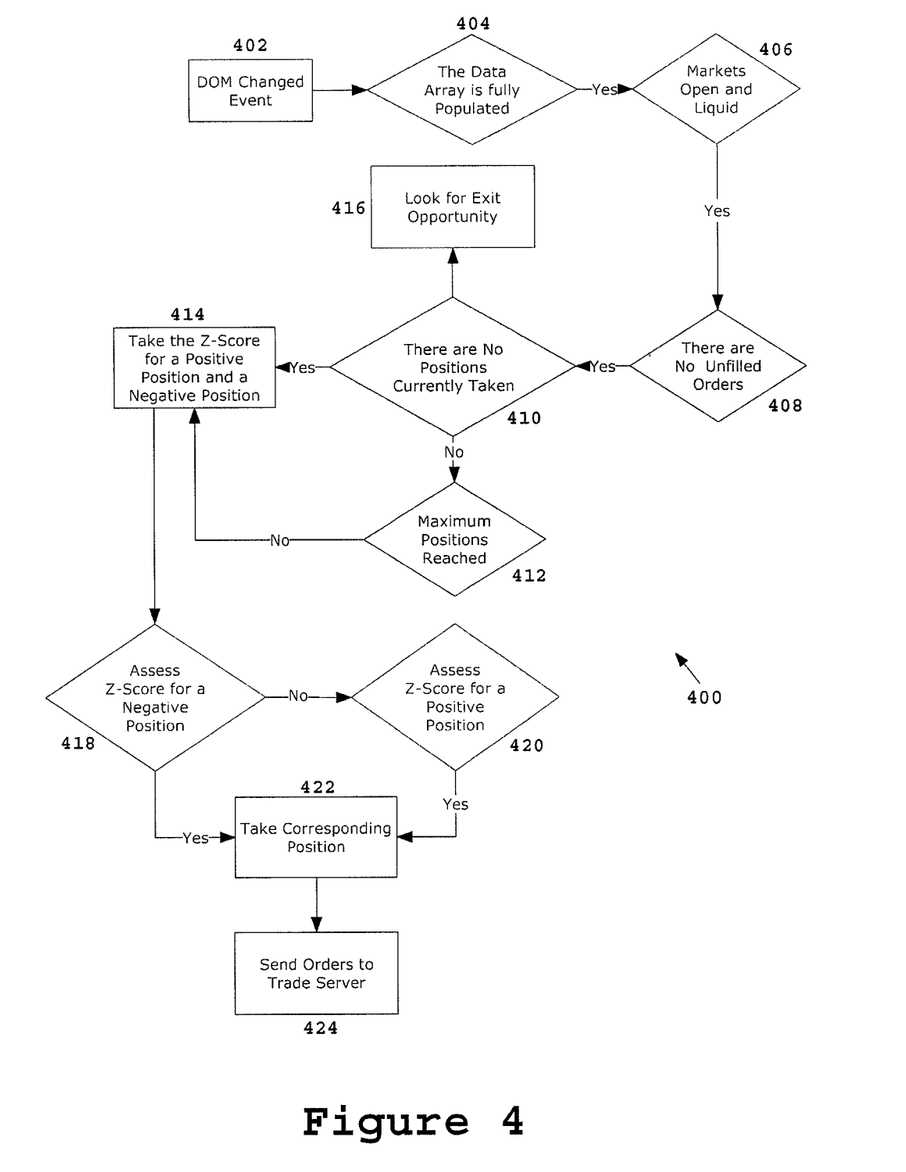
FIG. 4 represents various actions and positions taken in the computation and use of a Z-score.

With reference now to FIG. 4 of the Drawings, the DOM change event 128 is further explained. As generally illustrated by the reference numeral 400, upon a DOM changed event 402, determinations are made if the array is fully populated with data 404, whereby the full operational aspects of the present invention are available, the markets are open and liquid 406, there are no unfilled orders 408 and whether there are no current positions taken 410. If there are current positions taken, then a determination is made whether a maximum positions has been reached 412.

If no current positions taken 410 or the maximum positions have been reached 412, then the aforementioned Z-score positive and negative positions are taken 414. Additionally, if no current positions taken 410, then an exit opportunity should be sought 416. Once the positive and negative Z-score positions are determined 414, then if a negative Z-score 418 or a positive Z-score 420, the requisite position is then taken 422, and an order is sent to the trade server 424 pursuant to the position.

More particularly, the Z-score is essentially a quantitative rating system for how far the current ratio has deviated from the recent mean. The Z-scores of the ratios of [Offer of contract 1/bid of contract 2] and [bid of contract 1/offer of contract 2] are used to take "Negative" and "Positive" positions, respectively, as shown in FIG. 4.

Figure 5:
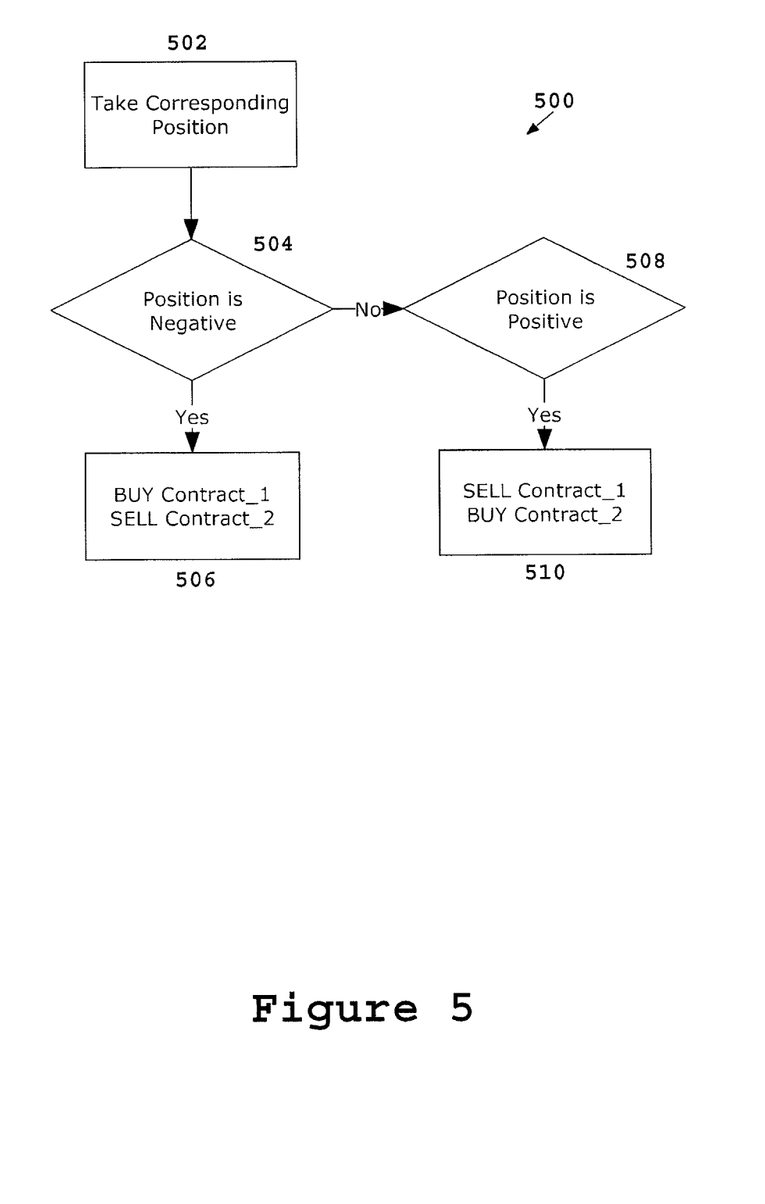
FIG. 5 illustrates representative positions taken on the Z-score of FIG. 4 and actions resulting from those positions.

With reference now to FIG. 5 of Drawings, the take corresponding position 422 illustrated in FIG. 4 is shown in more detail. Generally designated by the reference numeral 500, if the position 502 is negative 504, then actions 506 are taken, i.e., buying contract 1 and selling contract 2. More particularly for the Negative 504 position, the following actions would be considered:

BUY A contracts of Contract 1 @ the Ask price using a limit order; and

SELL B contracts of Contract 2 @ the Bid price using a limit order.

With further reference to FIG. 5, if the position 502 is positive 508, then actions 510 are taken, i.e., reciprocally selling contract 1 and buying contract 2. More particularly for the Positive 508 position, the following actions would be considered:

SELL A contracts of Contract 1 @ the Bid price using a limit order; and

BUY B contracts of Contract 2 @ the Ask price using a limit order.

A signal Z-score can be set at one or negative one, and if the ask of contract one divided by the bid of contract two and the Z-score of that is less than a signal, then the program triggers the buy of one contract of contract one and a sell of a contract of contract two 506. In the alternative, if the bid of contract one divided by the ask of contract two is positive 508, then the program is triggered to sell contract one and buy contract two 510. Buy contracts are done by buying at the ask and selling at the bid. It should be understood that the trigger for beginning trading is when contract one and contract two volumes are equal to zero. It should also be understood, however, that this actual ratio varies based on the markets being traded and the appropriate hedge, which will be discussed in further detail in the following paragraphs.

The positions are built up using the present invention to purchase the smallest number of lots possible for each trade. Every time an order is placed, using the maximum of two contracts at a time, the total portfolio is increased in a uniform manner, ideally as close to the optimal hedging ratio as possible.

Figure 6:
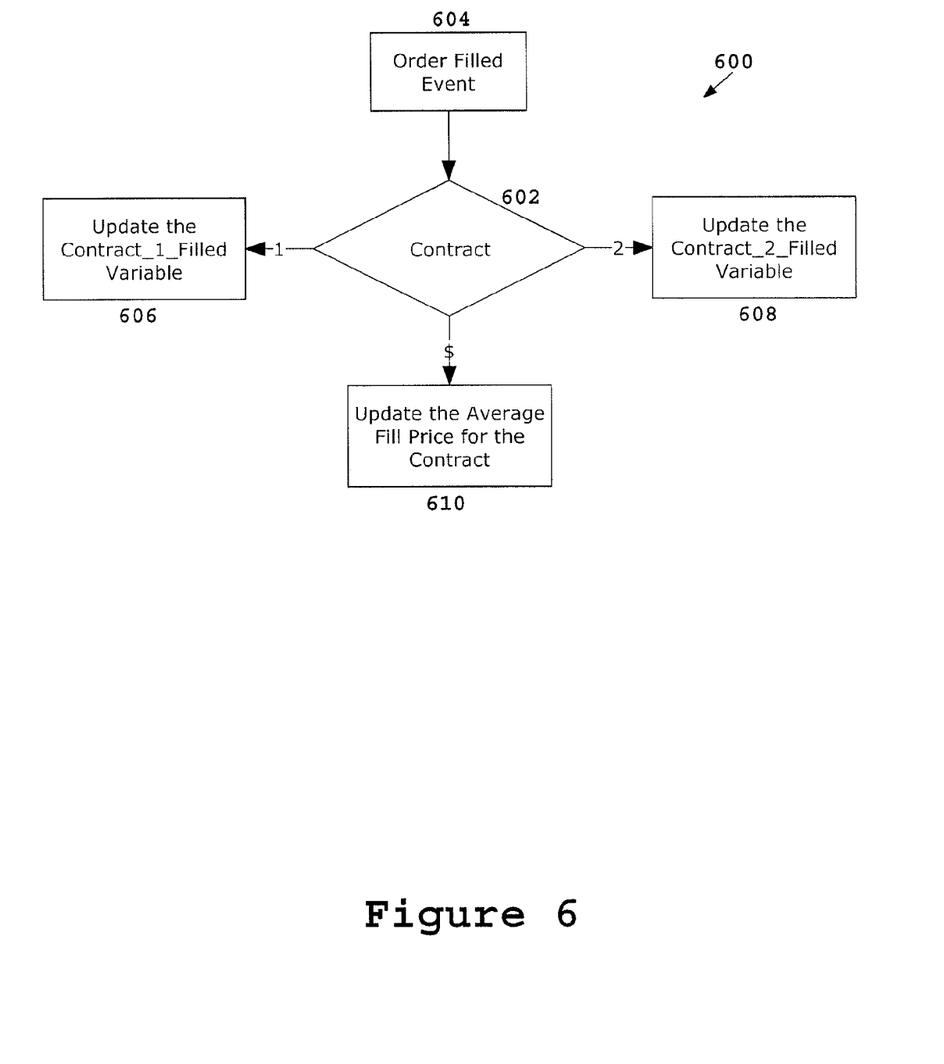
FIG. 6 illustrates various contract variables updates made pursuant to the present invention.

With reference now to FIG. 6 of the Drawings, there are illustrated various actions taken in connection with contracts, generally designated by the reference numeral 600. A contract 602 is the result of an order filled event 604, as described hereinabove. Upon receipt of the order, variables concerning the filled status contract one and two are updated, 606 and 608, respectively, as well as a variable on the average fill price under the contract 610.

Regardless of the hedging ratio, for as long as the maximum positions have not been acquired, the program will increase its position in the market while the Z-score instructs it to do so (422). Every time an order is sent to the trade server 424 and filled 506/510, a confirmation is sent from the server back to the client running the code. The program maintains a record of the number of contracts it has and the average price paid for each contract, as described in connection with FIG. 6. This number is important for exiting the position.

Figure 7:
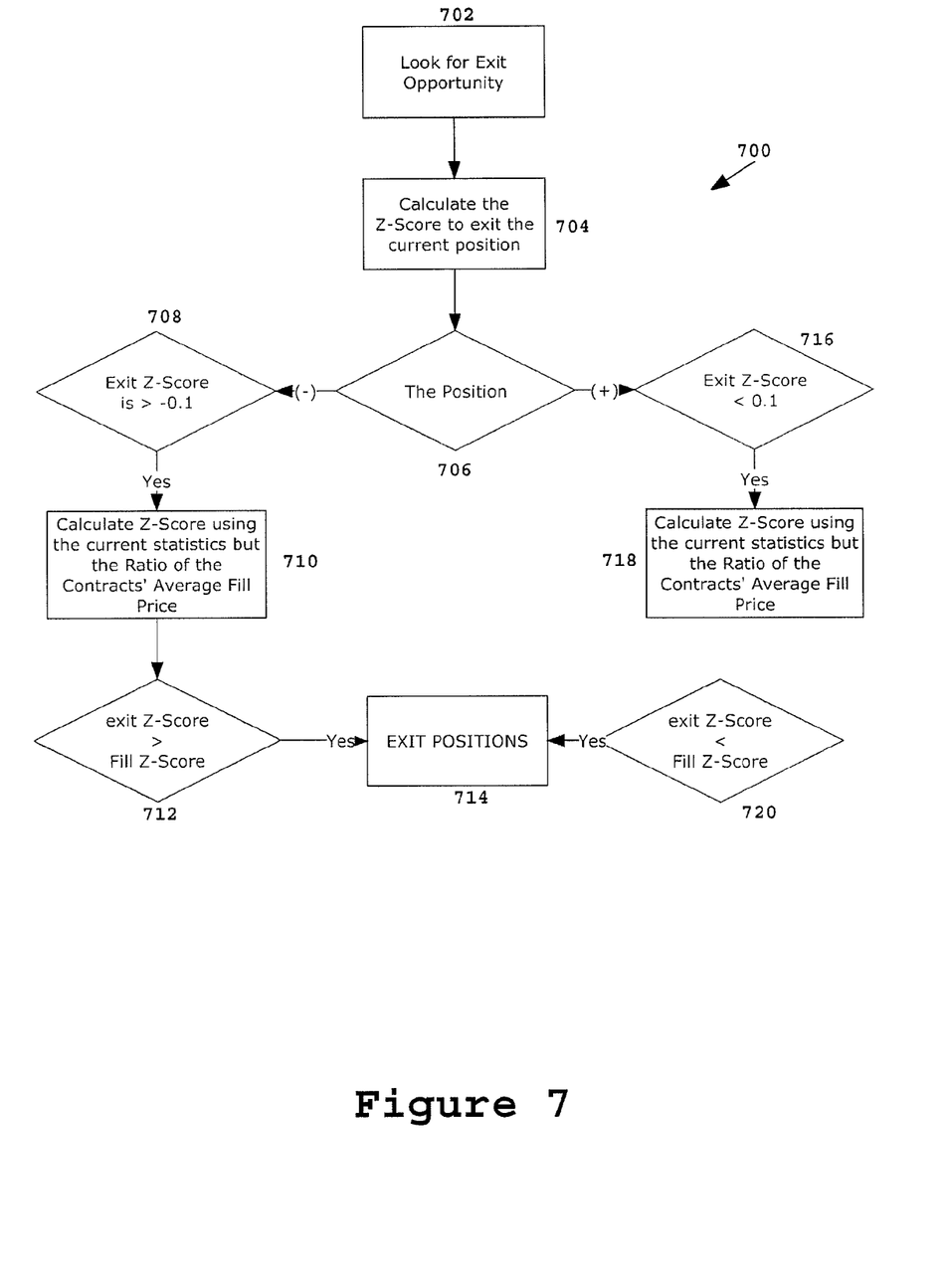
FIG. 7 illustrates further operational features of the present invention.
Figure 8:
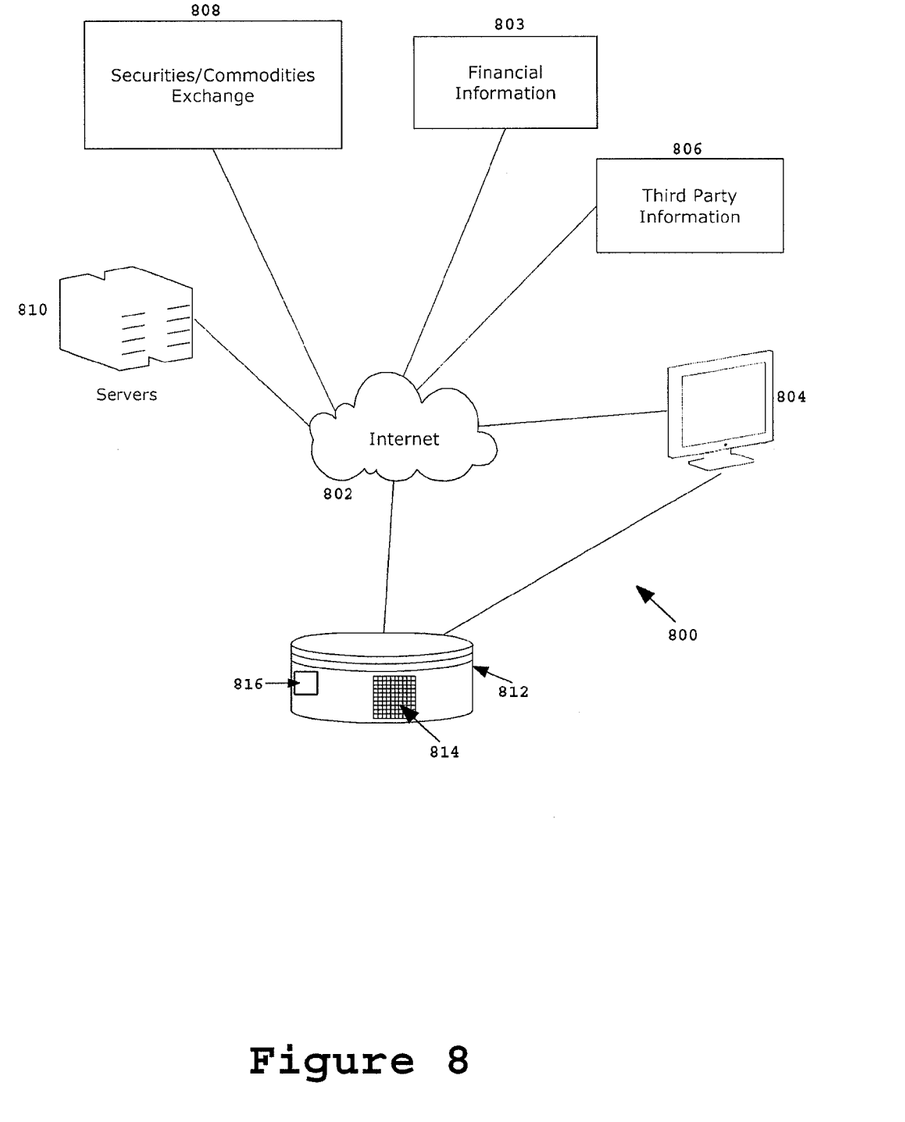
FIG. 8 illustrates various system components employing the features of the present invention.

Once the orders for contract one and contract two are filled, then the program immediately begins to look for an exit signal (416). With reference now to FIG. 7 of the Drawings, the aforementioned exit strategy is further described and illustrated, as generally designated by the reference numeral 700. Upon indication of exit strategy 702, the aforementioned Z-score is calculated 704 and the determined position 706 ascertained. As discussed, if the entrance signal was negative, then the program looks for a Z-score, contract one bid divided by contract two, ask, to be greater than zero 708, in which case, the second test 710 is used, that is, whether the Z-score of the current market conditions for exiting the position is greater than the Z-score of [average fill of contract 1/the average fill of contract 2] also using the current market conditions 712. Only then are the positions are zero'd out one contract at a time 714.

It is exactly the opposite if you are holding the other position, and the entrance signal was positive 716, the aforementioned second test used 718 to determine the Z-score 720 and exit position taken 714.

This feature of the second condition for exiting (710, 718) in an important feature for the success of the program. To again revert to the dilemmas faced when using short spans of historical data as the sample set, the statistical calculations are a direct result of the data set. However, when the data set is only 2 days long, for example, a position held for half of a day can see ¼ of the information which recommended the position be taken disappear and be replaced. In some volatile cases, Applicant has seen a position held for an entire day within a fraction of the sell signal, but the dynamic nature of the data set forced the program to hold the position to take the burden of the loss for the entire day.

This second condition ensures that these positions will not be exited as a large loss simply because of the affect of the 2-day data set.

As an example of how the present invention is used in a dynamic market, Applicant applied the principles of the current invention to the volatile crude market during the summer months of 2007. During this time, Applicant made various observations.

First, NYMEX requires a certain cash margin up front for every futures contract purchased or sold. This margin is calculated by the exchange to make sure that someone has enough money to cover a "one day maximum expected loss" for the contract. This limits leverage and makes sure that the contracts traded by their exchange can be completed. Because crude is strongly correlated with gasoline, they give a "margin credit" for going long on one and shorting the other (i.e., crude margin: $6,412 and gasoline margin: $6,075 but if you buy one and short the other, the total margin is something like $3,800).

They have several different ratios of assorted contracts that they offer these margin "credits" for. Such as 3:2:1 (crude: gasoline:heating oil) or 2:2:5 (gasoline:heating oil:crude). In designing the program, applicant operated under the assumption that the exchange formulated these credits based on how correlated the ratios are and how well one was hedged against the other. Applicant found that none of these credit ratios actually hedged accurately. In fact, they were so inaccurately biased towards the fluctuation of gasoline, that over a long-term back test the risk was very high and the profit was only when gasoline behaved as predicted.

Applicant therefore looked at the physical crude to gasoline yield ratio (as published by the Department of Energy) and ran a back test with that and determined that the maximum loss that was ever experienced in the past 10 years was decreased by 8-9 times and that the average volatility of the hedge was decreased by approximately 47% per day. This is a substantial amount.

Most people on the trading floor and traders in general have classically used the 3:2:1, 2:2:5 and 1:1 spread because they can calculate it in their head quickly. And traders tend to play around with the ratio based on how it is moving throughout the day. Applicant has also learned that some traders (specifically traders hedging refineries' stocks and future production) have their own methods of determining hedging ratios. But as far as speculation traders, Applicant has not heard about using the Department of Energy numbers used herein which is important for decreased risk and overall profit and success of the program, probably because it is more difficult to calculate a changing ratio as fast as the market moves, by hand that is.

Applicant notes that improvements in risk assessment can help determine exactly how much to leverage based on the size of the account and the current/historical market activity.

The principles of the present invention are also applicable in various other trading contexts, as is well understood to those skilled in the art, e.g., options trading.

What is claimed is:

1. A trading system comprising:
    a database containing data related to at least one pair of investment items,
    wherein said data comprises a plurality of bid data and ask data on each said investment item over a given period, and a plurality of ratio indicators on the bid/ask spread between a given pair of investment items; and
    a processor, connected to said database, determining a valuation of said given pair of investment items in relation to each other,
    wherein a given ratio indicator is based upon respective correlated bid and ask data on said given pair of investment items, said correlated bid and ask data containing bid one and ask one for the first investment item, and bid two and ask two for said second of said pair of investment items, and
    wherein a pair of ratio indicators are computed by said processor, a first said ratio indicator being computed by dividing bid one by ask two, and a second ratio indicator being computed by dividing ask one by bid two,
    whereby a plurality of said ratio indicators of a plurality of pairs of said investment items provide improved arbitrage and other investment opportunities.

2. The trading system according to claim 1, wherein the given pair of investment items are selected from the group consisting of commodities, contracts, futures, equities, options and combinations thereof.

3. The trading system according to claim 1, wherein said valuation is performed upon occurrence of a market depth change.

4. The trading system according to claim 1, wherein, upon occurrence of a valuation disparity from a normal position, said processor initiates a buy or sell order on at least one of said given pair of investment items.

5. The trading system according to claim 4, wherein said processor monitors said buy or sell orders.

6. The trading system according to claim 4, wherein said processor monitors the data and ratio indicators in said database until said normal position resumes.

7. The trading system according to claim 1, wherein said processor automatically initiates an order upon detection of a trigger condition.

8. A method for trading investment items comprising:
    accumulating a plurality of historical data related to at least one pair of correlated investment items;
    storing said historical data in a database, said database comprising at least bid data and ask data on each said investment item over a given period;
    calculating, by a processor in communication with said database, from respective correlated pairs of said investment items, respective ratio indicators from said bid data and ask data;
    wherein a given ratio indicator is based upon respective correlated bid and ask data on a given one of said pair of investment items, said correlated bid and ask data containing bid one and ask one for the first investment item, and bid two and ask two for said second of said pair of investment items, wherein a pair of ratio indicators are computed from said given pair of investment items, a first said ratio indicator being computed by dividing bid one by ask two, and a second ratio indicator being computed by dividing ask one by bid two;

storing said pair of ratio indicators in a database;

processing, by said processor, said historical data and said at least one pair of ratio indicators in said database, and valuating said at least one pair of investment items, whereby a plurality of said ratio indicators of said at least one pair of investment items provide improved arbitrage and other investment opportunities.

9. The method according to claim 8, wherein the investment items are selected from the group consisting of commodities, contracts, futures, equities, options and combinations thereof.

10. The method according to claim 8, wherein said step of calculating is performed upon occurrence of a market depth change.

11. The method according to claim 8, wherein, upon occurrence of a valuation disparity from a normal position said processor initiates a buy or sell order on at least one of said given pair of investment items.

12. The method according to claim 11, wherein said processor monitors said buy or sell orders.

13. The method according to claim 11, wherein said processor monitors the data and ratio indicators in said database until said normal position resumes.

14. The method according to claim 11, wherein processor automatically initiates an order upon detection of a trigger condition.

15. A trading system comprising:
  a historical data accumulator, said historical data accumulator gathering data related to at least one pair of investment items,
  said historical data comprising at least bid data and ask data on each said investment item for a given period,
  said accumulator processing said bid data and ask data for each said investment item and forming at least two ratio indicators from said bid data and ask data,
  wherein said at least two ratio indicators are respectively based upon respective correlated bid and ask data on said pair of investment items, said correlated bid and ask data containing bid one and ask one for the first investment item, and bid two and ask two for said second of said pair of investment items, and
  wherein a pair of ratio indicators are computed, a first said ratio indicator being computed by dividing bid one by ask two, and a second ratio indicator being computed by dividing ask one by bid two,
  a database, said database correlatedly populated with said bid data and ask data from each said investment item and said at least two ratio indicators; and
  a processor, employing said data and said ratio indicators in said database, determining a valuation of said pair of investment items,
  whereby a plurality of said ratio indicators of said at least one pair of investment items provide improved arbitrage and other investment opportunities.

16. The trading system according to claim 15, wherein each of said investment items are selected from the group consisting of commodities, contracts, futures, equities, options and combinations thereof.

17. The trading system according to claim 16, wherein said processor monitors the data and ratio indicators in said database until said normal position resumes, and
  wherein said processor automatically initiates an order upon detection of a trigger condition.

18. The trading system according to claim 15, wherein said valuation by said processor is performed upon occurrence of a market depth change.

19. The trading system according to claim 15, wherein, upon occurrence of a valuation disparity from a normal position, said processor initiates a buy or sell order on at least one of said at least one pair of investment items.

20. The trading system according to claim 19, wherein said processor monitors said buy or sell orders.

* * * * *